United States Patent [19]

Degeilh

[11] Patent Number: 4,696,971

[45] Date of Patent: Sep. 29, 1987

[54] PROCESS FOR THE PREPARATION OF POLYVINYL BUTYRAL HAVING IMPROVED PROPERTIES

[75] Inventor: Robert Degeilh, Le Port Marly, France

[73] Assignee: Saint Gobain Vitrage, Courbevoie, France

[21] Appl. No.: 838,230

[22] Filed: Mar. 10, 1986

Related U.S. Application Data

[63] Continuation of Ser. No. 620,053, Jun. 13, 1984, abandoned.

[30] Foreign Application Priority Data

Jun. 14, 1983 [FR] France ................................ 83 09840

[51] Int. Cl.$^4$ ............................................... C08F 8/00
[52] U.S. Cl. ..................................................... 525/61
[58] Field of Search .......................................... 525/61

[56] References Cited

U.S. PATENT DOCUMENTS

| | | | |
|---|---|---|---|
| 2,345,946 | 2/1942 | Overbaugh | 525/61 |
| 2,668,803 | 9/1950 | Lantz et al. | 525/61 |
| 2,915,504 | 12/1959 | Berardinelli | 525/61 |
| 3,153,009 | 10/1964 | Rombach | 525/56 |
| 4,205,146 | 5/1980 | Hermann et al. | 525/61 |

FOREIGN PATENT DOCUMENTS

| | | |
|---|---|---|
| 566004 | 2/1943 | United Kingdom ............ 525/61 |
| 2007677 | 5/1979 | United Kingdom . |

Primary Examiner—Joseph L. Schofer
Assistant Examiner—J. M. Reddick
Attorney, Agent, or Firm—Pennie & Edmonds

[57] ABSTRACT

A process for the preparation of a polyvinyl butyral having improved properties comprises subjecting a polyvinyl alcohol in an aqueous medium in the presence of butyraldehyde and an acid catalyst and sodium dioctyl sulfosuccinate (DOS), effective as an emulsifier, neutralizing the reaction mixture to a pH of 5, and thereafter recovering the polyvinyl butyral by separating it from the reaction liquors and thoroughly washing it with water.

14 Claims, No Drawings

PROCESS FOR THE PREPARATION OF POLYVINYL BUTYRAL HAVING IMPROVED PROPERTIES

This is a continuation of application Ser. No. 620,053 filed June 13, 1984, now abandoned.

TECHNICAL FIELD

This invention relates to a process for the preparation of polyvinyl butyral having improved properties. This process is adapted to the preparation of polyvinyl butyral of fine particle size and of high quality. Polyvinyl butyral sheeting made from this polyvinyl butyral product is resistant, homogeneous, of good breaking strength, and therefore uniquely suitable for use as an interlayer for laminated safety glass.

BACKGROUND ART

Various processes for preparing polyvinyl butyral are well known in the art. For example, French Pat. No. 2,401,941, which is incorporated herein by reference, discloses a process in which polyvinyl alcohol is dispersed in an aqueous solution and reacted with butyraldehyde in the presence of an acid. In particular, an aqueous solution containing polyvinyl alcohol of 8 to 15 percent by weight is reacted at a temnperature of from 5° to 12° C. with butyraldehyde in the presence of an acid and an emulsifier. A sufficient amount of butyraldehyde is used in order to react 75 percent to 88 percent of the polyvinyl alcohol in the reaction mixture. This amount is added to the mixture gradually so that the polyvinyl butyral precipitates in the form of particles 10 to 90 minutes after the start of the reaction. The reaction mixture is then agitated for more than 30 minutes at a temperature of 8° to 15° C., after which the reaction process is accelerated by an increase in temperature to between 60° and 80° C., for 1½ to 4 hours. Subsequently, a base is introduced into the reaction mixture to neutralize it to a pH level between 9 and 11 (hereinafter referred to as the "neutralization process"). The reaction is then continued for more than ¼ hour at this temperature. The after-treatment of the polyvinyl butyral is completed by the separation of the final product by filtration, followed by a thorough washing with water.

When the high-quality polyvinyl butyral obtained from the above processes is admixed with a plasticizer, a polyvinyl sheeting results having properties satisfactory for the subsequent handling of the sheeting and performance in a laminar structure such as laminated safety glass. These properties include a reduced tendency to compression flow; exceptional laminar and support strength and impact resistance (e.g., in falling ball tests); enhanced bonding properties to contiguous glass surfaces (e.g., in pummel tests); and high transparency properties.

However, the drawbacks of these processes can be seen when the emulsifier used is a sodium alkylsulfonate or sodium alkylaryl-sulfonate, such as sodium dodecyl-benzene-sulfonate or sodium aryl-sulfonate. These emulsifiers are necessary to prevent an agglomeration of polyvinyl butyral particles which would greatly diminish the optical quality of the polymer product. Unfortunately, if these emulsifiers are left in the polyvinyl butyral product, they also reduce the product's ability to adhere to glass. As a result, these emulsifiers must be removed in the after-treatment of the polyvinyl butyral product. Typically, this after-treatment is carried out in an aqueous medium under basic conditions, namely, at a pH between 9 and 11. Most frequently, soda is used in this after-treatment to neutralize the acid of the catalyst to the desired pH level. Unfortunately, soda or other substitute chemicals required for the neutralization process significantly increase the cost of the after-treatment treatment process of polyvinyl butyral. In addition, this process prolongs the already lengthy after-treatment process of polyvinyl butyral. Moreover, during after-treatment, the butyraldehyde is condensed to form a number of precipitates, including ethyl-2-hexenal, which has a very unpleasant odor.

SUMMARY OF THE INVENTION

The present invention relates to a process for the preparation of polyvinyl butyral having improved properties and comprises the process disclosed in French Pat. No. 2,401,941 with the additional conditions that (i) sodium dioctyl sulfosuccinate (DOS) is used as an emulsifier instead of sodium alkylsulfonate or sodium alkylaryl-sulfonate, and (ii) the "neutralization process" is discontinued as soon as a pH of approximately 5 is reached.

Advantageously, in the present invention, the emulsifier DOS is completely and inexpensively removed from the polymer by a thorough washing with water at ambient temperature. As a result, a product is inexpensively obtained which has superior adhesiveness to glass materials. In addition, unlike conventional washing processes, the washing process of the invention does not produce ethyl-2-hexenal, which has a very unpleasant odor.

In comparison to conventional emulsifiers, smaller quantities of DOS are required to produce identical quantities of polyvinyl butyral. Moreover, the use of DOS effective as an emulsifier substantially decreases the "curing time" of the polyvinyl butyral after neutralization to a range of 5 to 10 minutes. The period of curing using conventional polyvinyl butyral is generally one hour.

The process of the present invention provides polyvinyl butyral having improved properties. In comparison to polyvinyl butyral prepared using conventional processes, the polyvinyl butyral obtained according to the invention is marked by considerably reduced compression flow, increased laminar and support strength and stiffness, increased impact resistance, increased adhesiveness to contiguous glass surfaces, and increased transparency properties. Polyvinyl butyral sheeting made from this polyvinyl butyral product is resistant, homogeneous, of good breaking strength, and therefore uniquely suitable for use as an interlayer for laminated safety glass.

DESCRIPTION OF PREFERRED EMBODIMENTS

The present invention relates to a process for the preparation of polyvinyl butyral having improved properties and comprises the process disclosed in French Pat. No. 2,401,941, with the additional conditions that (i) sodium dioctyl sulfosuccinate (DOS) is used as the emulsifier instead of a sodium alkylsulfonate or sodium alkylaryl-sulfonate, and (ii) the "neutralization process" is discontinued as soon as a pH of approximately 5 is reached. In particular, the present invention comprises (i) subjecting a polyvinyl alcohol having a content of 8 to 15 percent by weight of vinyl alcohol in an aqueous solution, at a temperature of 5° to 12° C. and in the presence of an acid and DOS, effective as an emulsifier, to sufficient butyraldehyde, in order to react 75 to 88 percent of the polyvinyl alcohol in the reaction mixture within 10 to 90 minutes after the start of the reaction; (ii) agitating the reaction mixture for more than 30 minutes at a temperature of 8° to 15° C.; (iii) increasing the temperature to between 60° and 80° C. for 1½ to 4 hours; (iv) introducing a base into the reaction mixture to neutralize it to a pH level of approximately 5; (v) continuing the reaction for more than 5 minutes at this temperature and pH level; and finally (vi) subjecting the reaction mixture to an after-treatment which includes separating the polyvinyl butyral from the reaction liquors by filtration, followed by a thorough washing with water.

A particularly important requirement for improving the properties of the polyvinyl butyral according to the invention is the presence of DOS effective as an emulsifier. DOS advantageously facilitates the after-treatment of the polyvinyl butyral to separate the product. Unlike conventional emulsifiers which are removed from the polymer by the addition of a base, DOS is completely and inexpensively removed from the polymer by a thorough washing with water. As a result, a product is inexpensively obtained which has superior adhesiveness to contiguous glass materials. Moreover, the washing process can be carried out at a temperature of less than 20° C. Thus, water having an ambient temperature of 15° to 20° C. can be used to wash the emulsifier from the polymer, which minimizes the heat requirements of the after-treatment process of the polyvinyl butyral. In addition, unlike conventional washing processes, the washing process of the invention does not produce ethyl-2-hexenal, which has a very unpleasant odor.

In comparison to conventional emulsifiers, smaller quantities of DOS are required to produce identical quantities of polyvinyl butyral. The amount of DOS ranges from between 0.10 and 0.30 percent by weight, preferably around 0.15 percent by weight calculated on the amount of the polyvinyl alcohol used. As a result, the process of the present invention prepares a polymer product at a lower cost than prior art processes.

It is a special advantage of the invention that the use of DOS effective as an emulsifier substantially decreases the "curing time" of the polyvinyl butyral after neutralization. The period of curing using conventional polyvinyl butyral processes is generally one hour. Due to the use of DOS effective as an emulsifier in the present invention, this period is reduced to a range of from 5 to 10 minutes. As a result, the total time required to produce polyvinyl butyral by this invention is 50 to 55 minutes less than by conventional processes.

The processing of polyvinyl butyral obtained according to this invention into bonding sheets is carried out in the usual manner. Plasticizers such as esters of polyhydric alcohols or of polybasic acids are added to the polyvinyl butyral in adequate amounts to obtain sheets of polyvinyl butyral having sufficient flow properties. See, for example, European Pat. Nos. 0011577 and 0047215, which are incorporated herein by reference.

The manufacture of glass compounds with the aid of bonding sheets containing polyvinyl butyral treated according to the invention may be effected using conventional methods, for example by molding the sheet between two glass panes at a temperature between 120° and 160° C. and a pressure between 5 and 20 bars. Advantageously, the increased stickiness and reduced flow properties of the sheets facilitate the insertion of the sheets between convex glass panes and also reduce the formation of air bubbles in the polyvinyl butyral sheet.

In comparison to polyvinyl butyral prepared using most prior art processes, the polyvinyl butyral obtained according to the invention is marked by considerably reduced compression flow, increased laminar and support strength and stiffness, increased impact resistance, increased adhesiveness to contiguous glass surfaces, and increased transparency properties as shown by the following examples, in which parts and percentages are by weight unless otherwise indicated. In these examples, the following tests and procedures were used.

Compression flow test: The compression flow of the samples was measured by the following procedure. For each test, two specimens were cut from polyvinyl butyral laminate with a hollow punch. The laminate had a thickness of 0.76 mm (±0.01 mm) and the hollow punch had the shape of a disk with a 26-mm diameter. Each specimen was held between the plates of a heating press which was kept at a temperature of 135° C. For 5 minutes, each specimen was heated without application of pressure. Subsequently, a pressure of 10 bars was applied to each sample for a time period of 5 minutes. The diameter of each specimen after the 10-minute test was recorded and the compression flow for each specimen was calculated according to the following formula:

$$F = (D-26)/26 \times 100$$

where: D is the diameter (within 0.25 mm) of the specimen after the 10-minute flow test The average for the two specimens was reported for the sample. An average of at least 60 percent is required before the polyvinyl butyral laminate can be used as an interlayer in safety glass.

Pummel test: The pummel adhesion of the samples was measured by the following procedure. For each test, a 30.5-cm-square specimen was cut from a polyvinyl butyral laminate having a thickness of 0.76 mm. The moisture level of the laminate was preconditioned in a usual manner to have a level prescribed for conventional pummel tests. The square specimen was placed between two 30.5-cm-square glass sheets, each having a thickness of 3 mm. The polyvinyl butyral/glass laminate was then compressed under a pressure of 10 bars at a temperature of 138° C. for 20 minutes. A fraction of the specimen, typically having dimensions of 15 by 30 cm, was then subjected to the pummel test. First, this fraction of the specimen was cooled for 8 hours at a temperature of −18° C. It was then held in a pummel testing machine at a 45° angle to a supporting table. A force was evenly applied over a 10 by 15 cm area of the sample with a 450-g flathead hammer at a predetermined rate until the glass became pulverized. Once the glass pulverized, the glass remaining glued to the polyvinyl butyral was compared with a list of formal standards. These standards comprise a scale ranging from 0 to 10 and are given as:

| % of the Surface of the Polyvinyl Butyral Sheet That Came Unglued During Breaking | Pummel Values |
| --- | --- |
| 100 | 0 |
| 95 | 1 |
| 90 | 2 |
| 85 | 3 |
| 60 | 4 |

| % of the Surface of the Polyvinyl Butyral Sheet That Came Unglued During Breaking | Pummel Values |
| --- | --- |
| 40 | 5 |
| 20 | 6 |
| 10 | 7 |
| 5 | 8 |
| 2 | 9 |
| 0 | 10 |

The pummel test was performed on both surfaces of the laminated glass and a pummel value recorded for each surface tested. In general, good impact performance is attained at a pummel adhesion of greater than 5 for each surface, i.e., 5+5.

Falling ball test: The impact resistance of the samples was measured by the following procedure. Samples were prepared using the general procedure outlined in the description of the pummel test. Each polyvinyl butyral/glass laminate sample was kept at a temperature of 21° C. (±2°). It was then placed on a wooden frame so that the surface of the laminate was contiguous to the surface of the wooden frame. A force was applied to the sample by dropping a 2,270 gram steel ball from a predetermined height onto the central part of the polyvinyl butyral/glass laminate. The energy of each application of force was increased by increasing the height from which the steel ball was dropped. The height required for the dropped steel ball to penetrate the laminate to a depth of 10 percent was recorded. Impact performance is considered to be satisfactory when this height is greater than or equal to 5.18 meters (17 feet).

Test to determine haze: The haze of a transparent laminate is the percentage of luminous flux traveling through the laminate which is scattered at an angle of more than 2.5 degrees from the axis defined by the unscattered light path. The haze of the polyvinyl butyral/glass laminate was measured according to standard NF-54-111, which is in agreement with method A of standard ASTM D 1003-61. Samples for this test were prepared using the general procedure outlined in the description of the pummel test. In general, the optical properties required for polyvinyl butyral/glass laminates to be used as safety glass are attained at a haze test result of less than or equal to 0.3 percent.

Moisture resistance test: The moisture resistance of the samples was measured by the following procedure. Samples were prepared using the general procedure outlined in the description of the pummel test. Each sample was then boiled in water for 2 hours. It was the removed from the water and examined for formations of bubbles or white, translucent streaks on the periphery of the sample. In general, the absence of these formations indicates that the laminate has attained a good moisture resistance.

EXAMPLES

The following examples serve to illustrate the property of sheets using the process disclosed in French Pat. No. 2,401,941.

EXAMPLE 1

30 kg of a polyvinyl alcohol were stirred in a mixture of 300 liters of water, 67.5 g of sodium dodecylbenzene sulfonate, and 2.65 kg of hydrochloric acid having a density of 1.18 g/cc at a temperature of 10° C. 17.1 kg of butyraldehyde were then gradually reacted with the mixture over a time period of approximately 30 minutes. This reaction increased the temperature of the reaction mixture by a few degrees, changed its color to a whitish hue, and increased its viscosity. Near the end of this time period, polyvinyl butyral started to precipitate in the form of particles and the viscosity of the mixture started to decrease. The mixture was then allowed to stand for 30 minutes at a temperature of 13° C. Subsequently, the temperature was increased to 70° C. over a time period of 90 minutes. Next, the mixture was neutralized with 1.35 kg of soda to a pH of 10. This mixture was kept at a temperature of 70° C. for 60 minutes and was then washed several times with water having a temperature of 70° C. The polymer was filtered off with suction and dried in hot air.

Subsequently, the polymer was mixed with a plasticizer such as benzyl and octyl adipate using methods known in the art. Sheets having a predetermined thickness were molded from the extruded product. The following table shows selected properties of the resulting polymer sheets.

| | |
| --- | --- |
| Proportion of hydroxyl* | 17.5% |
| Proportion of ethyl-2-hexenal* | 1.06% |
| Flow* | 63% |
| Ball drop* | 5.8 M |
| Pummel*, ** | 5 + 5 |
| Haze* | .29 |

*determination according to the samples and tests outlined in the previous discussions.
**poorly washed samples yielded a pummel index of 1 + 1, which indicates an insufficient bond.

EXAMPLE 2

The general procedure of Example 1 was repeated except that the mixture was neutralized with soda to a pH of 5. Selected properties of the resulting polymer sheets are shown in the following table.

| | |
| --- | --- |
| Proportion of hydroxyl* | 17.5% |
| Proportion of ethyl-2-hexenal* | 0.06% |
| Flow* | 62% |
| Ball drop* | 6.4 M |
| Pummel*, ** | 1 + 2 |
| Haze* | .3 |

*cf. Example 1.
**poorly washed samples yielded a pummel index of 0 + 0, which shows that significant amounts of emulsifier remained in the polyvinyl butyral sheet, i.e., the emulsifier was poorly eliminated by washing.

The following examples serve to illustrate the invention. Properties of sheets obtained using the invention can be compared to properties of sheets obtained using the control processes of Examples 1 and 2.

EXAMPLE 3

The general procedure of Example 1 was repeated except that (i) 100 g of DOS were used as the emulsifier instead of sodium dodecylbenzene sulfonate and (ii) the reaction mixture was washed with water at ambient temperature. Selected properties of the resulting polymer sheets are shown in the following table.

| | |
| --- | --- |
| Proportion of hydroxyl* | 19.3% |
| Proportion of ethyl-2-hexenal* | 0.50% |
| Flow* | 63% |
| Ball drop* | 5.8 M |
| Pummel*, ** | 6 + 7 |

| -continued | |
|---|---|
| Haze* | .28 |

*cf. Example 1.
**poorly washed samples yielded a pummel index of 2 + 2.

EXAMPLE 4

The general procedure of Example 3 was repeated except that the product was washed with water at a temperature of 70° C. Selected properties of the resulting polymer sheets are shown in the following table.

| Proportion of hydroxyl* | 19.3% |
|---|---|
| Proportion of ethyl-2-hexenal* | 0.80% |
| Flow* | 61% |
| Ball drop* | 5.8 M |
| Pummel*, ** | 5 + 6 |
| Haze* | .27 |

*cf. Example 1.
**poorly washed samples yielded a pummel index of 2 + 3.

The significance of Example 4 in comparison to Example 3 is that washing with warm water does not significantly change the properties of the polymer. It is a special advantage of this invention that a product having high qualities can be obtained by washing with water at ambient temperature.

EXAMPLE 5

The general procedure of Example 3 was repeated except that 50 g of DOS were used and the neutralization process was discontinued as soon as a pH of approximately 5 was reached. Selected properties of the resulting polymer sheets are shown in the following table.

| Proportion of hydroxyl* | 19.3% |
|---|---|
| Proportion of ethyl-2-hexenal* | 0.04% |
| Flow* | 62% |
| Ball drop* | 5.8 M |
| Pummel*, ** | 8 + 9 |
| Haze* | .27 |

*cf. Example 1.
**poorly washed samples yielded a pummel index of 5 + 5.

The significance of Example 5 in comparison to Example 3 is that smaller quantities of emulsifiers yield a product of superior quality in pummel value and of even quality in all other respects with the exception of proportion of ethyl-2-hexenal in the product.

EXAMPLE 6

The general procedure of Example 5 was repeated except that, after neutralization of the reaction mixture to a pH of 5, 50 g soda were added to the mixture during a first washing with water at 70° C. to obtain a pH of 10. The product was then washed a second time with water at 70° C. and a third time with water at ambient temperature. Selected properties of the resulting polymer sheets are shown in the following table.

| Proportion of hydroxyl* | 19.3% |
|---|---|
| Proportion of ethyl-2-hexenal* | 0.03% |
| Flow* | 61% |
| Ball drop* | 6.7 M |
| Pummel*, ** | 5 + 8 |
| Haze* | .28 |

*cf. Example 1.
**poorly washed samples yielded a pummel index of 4 + 5.

The significance of Example 6 in comparison to Example 5 is that an additional neutralization phase in the after-treatment process of polyvinyl butyral does not significantly change the properties of the polymer.

EXAMPLE 7

The general procedure of Example 5 was repeated except that the curing time of the polyvinyl butyral, after neutralization, was limited to approximately 5 minutes. Selected properties of the resulting polymer sheets are shown in the following table

| Proportion of hydroxyl* | 19.3% |
|---|---|
| Proportion of ethyl-2-hexenal* | 0.04% |
| Flow* | 61% |
| Ball drop* | 6.6 M |
| Pummel*, ** | 6 + 7 |
| Haze* | .29 |

*cf. Example 1.
**poorly washed samples yielded a pummel index of 4 + 5.

The significance of Example 7 in comparison to Example 5 is that the curing time of the polyvinyl butyral can be greatly reduced without altering the superior qualities of the polymer.

What is claimed is:

1. A process for the preparation of a polyvinyl butyral having improved properties which comprises subjecting a polyvinyl alcohol in an aqueous medium in the presence of butyraldehyde and an acid catalyst and an emulsifier to form a reaction mixture and thereafter recovering the polyvinyl butyral, said process being characterized in that:

said polyvinyl alcohol comprises about 8 to 15 percent by weight of said aqueous medium;

said emulsifier comprises sodium dioctyl sulfosuccinate (DOS) in an amount effective as an emulsifier, and between about 0.1 and 0.3 percent by weight calculated on the weight of polyvinyl alcohol;

said DOS is added to said reaction mixture before said butyraldehyde;

prior to addition of said butyraldehyde to said reaction mixture, said aqueous medium of polyvinyl alcohol, acid catalyst, and emulsifier have a temperature of about 5° to 12° C.;

said butyraldehyde comprises sufficient weight to react about 75 to 88 percent of said polyvinyl alcohol in said reaction mixture;

said butyraldehyde is reacted gradually to precipitate said polyvinyl butyral within a time period ranging from about 10 to 90 minutes after the start of said reaction;

subsequent to forming said reaction mixture, said reaction mixture is agitated for a time period of at least about 30 minutes at a temperature of about 8° to 15° C.;

subsequently, the temperature of the reaction mixture is raised to a temperature range between about 60° to 80° C. for a period of time between about 1½ and 4 hours;

subsequently a base is incorporated into said reaction mixture to neutralize it to a pH of approximately 5, the pH being maintained at this value throughout the subsequent recovery process;

said reaction mixture then cured between said 60° to 80° C. temperature range for a period of less than about 10 minutes; and precipitated polyvinyl butyral is then washed from said reaction mixture with water.

2. A process of claim 1 wherein said precipitated polyvinyl butyral is recovered from said reaction mixture by washing with water at ambient temperature.

3. A process of claim 1 wherein said acid catalyst comprises hydrochloric acid.

4. A process of claim 1 wherein said DOS comprises an amount of around 0.15 percent by weight calculated on the polyvinyl alcohol.

5. A process of claim 1 wherein the time duration of said curing phase, after neutralization, is between 5 and 10 minutes.

6. A polyvinyl butyral obtained by the process of claim 1.

7. A plasticized polyvinyl butyral sheet comprising polyvinyl butyral and plasticizing material wherein said polyvinyl butyral is obtained by the process of claim 1.

8. In a process for preparing polyvinyl butyral having improved properties which comprises reacting polyvinyl alcohol with butyraldehyde in the presence of an acid catalyst and an emulsifier comprising dioctyl sulfosuccinate (DOS); the improvement which comprises adding said emulsifier to an aqueous medium containing said polyvinyl alcohol to form a solution, said emulsifier added to the aqueous medium prior to the addition of said butyraldehyde in an amount of between about 0.1 and 0.3 by weight based on the weight of the polyvinyl alcohol;

gradually adding said butyraldehyde to said solution to form a reaction mixture and to precipitate the polyvinyl butyral;

adding a base to said reaction mixture to neutralize it to a pH of approximately 5; and maintaining the pH at approximately 5 while recovering the precipitated polyvinyl butyral from the reaction mixture by washing said mixture with water.

9. The method of claim 8 wherein said polyvinyl alcohol comprises about 8 to 15 percent by weight of said aqueous medium and said butyraldehyde is added in an amount sufficient to react between about 75 to 88 percent of said polyvinyl alcohol in said aqueous medium.

10. The method of claim 9 which further comprises maintaining said solution at a temperature of between about 5° and 12° C. prior to adding said butyraldehyde.

11. The method of claim 10 wherein said reaction mixture is agitated for at least 30 minutes before the temperature of said mixture is raised to between about 60° and 80° C.

12. The method of claim 8 wherein the reaction mixture is cured at a temperature of between 60° and 80° C.

13. A polyvinyl butyral obtained by the process of claim 8.

14. A plasticized polyvinyl butyral sheet comprising polyvinyl butyral and plasticizing material wherein said polyvinyl butyral is obtained by the process of claim 8.

* * * * *